Oct. 20, 1959   J. H. McLANE   2,909,021
LAWN TRIMMING AND EDGING APPARATUS
Filed Aug. 19, 1957   2 Sheets-Sheet 1
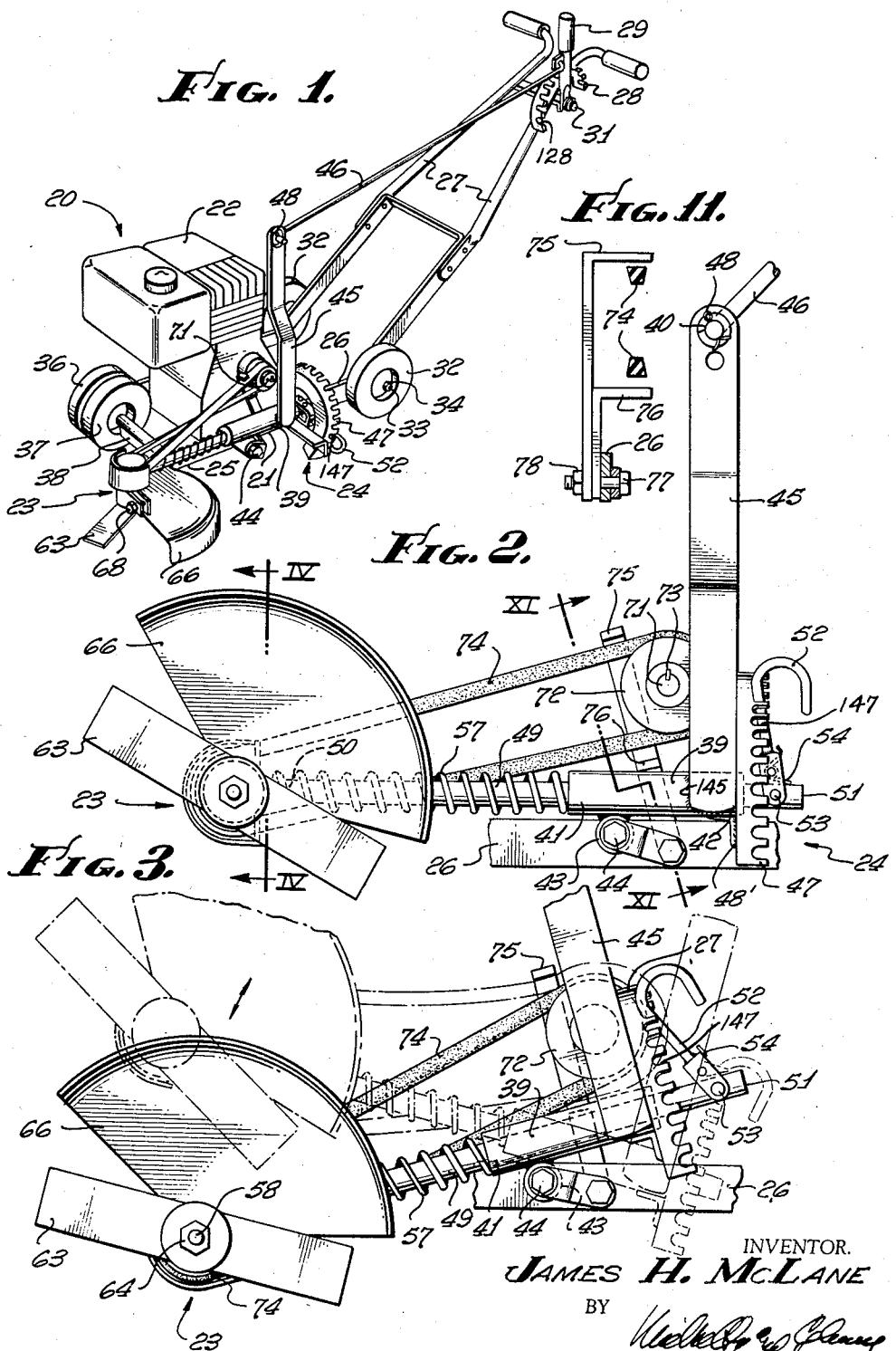
INVENTOR.
JAMES H. McLANE
BY
ATTORNEYS.

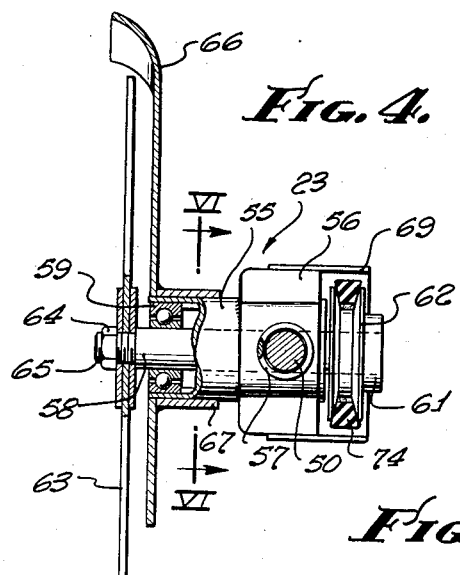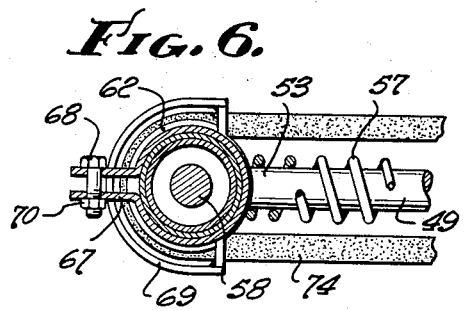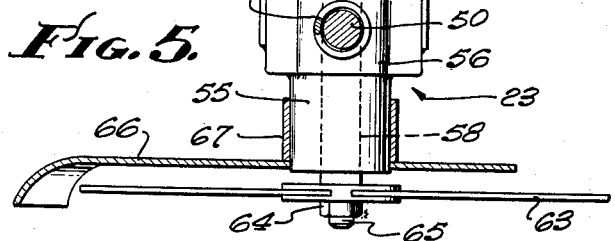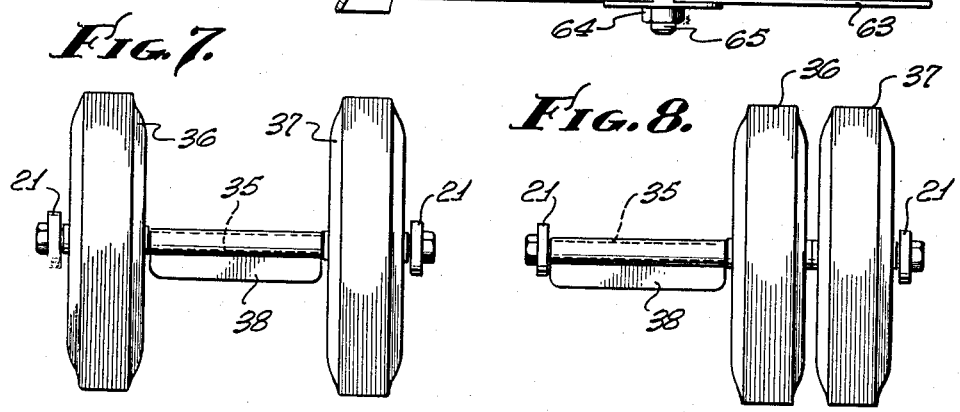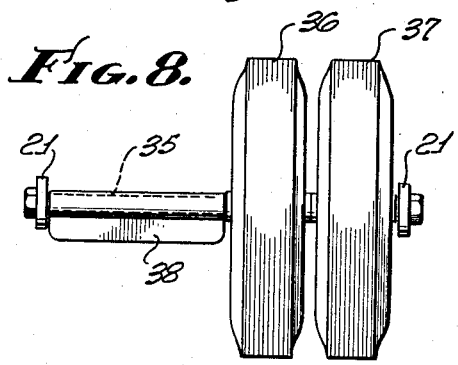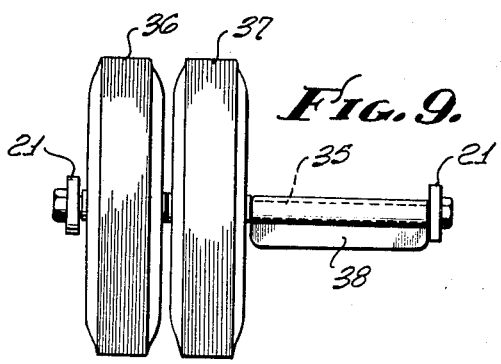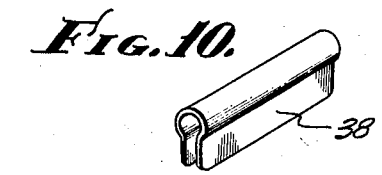

United States Patent Office 2,909,021
Patented Oct. 20, 1959

2,909,021

LAWN TRIMMING AND EDGING APPARATUS

James H. McLane, Long Beach, Calif., assignor to McLane Tool and Die Company, Compton, Calif., a copartnership Application August 19, 1957, Serial No. 678,949

3 Claims. (Cl. 56—25.4)

The present invention relates to a lawn trimming and edging apparatus in which a stable condition is maintained when the apparatus is being used to trim or edge a lawn.

One of the prime difficulties in maintaining a well kept lawn is the trimming and edging of the lawn along the sides of a building, a flower bed, a sidewalk, or a curb. The common hand or power lawnmower is not capable of adequately trimming and edging a lawn as the mowers are generally too large and cumbersome to fit into tight places, and they are not designed to edge a lawn or cut too closely to the side of a building or the like. Therefore, there arose a definite need for an apparatus to properly trim and edge the borders of a lawn.

There are known lawn trimming and edging apparatuses on the market today, but they contain certain disadvantages. Some of these apparatuses are only designed to either trim or edge and thus two separate machines are needed. The combined trimming and edging machines have only a single supporting wheel on the front end of the machine which becomes very difficult to push forward because the single front wheel digs into the lawn, especially when the machine is being used as an edger. Also, the combined trimming and edging machines are easily tiltable. This is a disadvantage because if the cutting blade is positioned to trim or edge the grass of the lawn at a definite angle, the easily tiltable machines will generally not be able to trim or edge the grass at the preset angle of cut. Therefore, even if the combined trimming and edging machines have means for setting the cutting angle for the cutter blade, this feature is greatly reduced in value because of the ease in which the machines tilt.

In the present invention, all of the disadvantages noted above have been overcome. An apparatus is provided that will function either as a trimmer or an edger. This eliminates the need for two separate machines. Also, in this trimming and edging apparatus, the disadvantage of having only a single supporting wheel in the front has been eliminated by providing a pair of front wheels which are slidably mounted on a horizontally disposed axle. These wheels are slidably mounted in order for them to be placed in two positions: a spaced position when the cutting blade is in the vertical edging position, and adjacent each other when the cutting blade assumes the horizontal trimming position. A detachable keeper means is used to retain the front wheels in either of the above described positions. By allowing the front wheels to be spaced from each other when the cutting blade is in the vertical edging position, greater stability and support are afforded to the apparatus. Therefore, the front wheels are not as easily buried in the ground during an edging operation of the apparatus as is the above described apparatus having only a single front wheel support. Also, when the apparatus is being used as a trimmer, the adjacent front wheels offer two points of support as against only the one point of support for the known machines.

Also in the present apparatus, means are provided for creating a greater tension on the driving belt, which prevents slippage, as the cutter blade is lowered to trim or edge the grass at a reduced height in which position the greatest resistance is generally encountered by the cutter blade.

An object of the present invention is the provision of an apparatus which will both trim and edge a lawn.

Another object is to provide a lawn trimming and edging apparatus which is stable and not easily tilted.

A further object of the invention is to provide a lawn trimming and edging apparatus in which the front end of the apparatus is adequately supported against digging deeply into the lawn especially during the edging operation.

Still another object is to provide a lawn trimming and edging apparatus that has means for varying the cutting height of the cutting blade and simultaneously prevents any slippage in the cutter blade driving means.

A still further object of the present invention is the provision of a simple cutter blade mounting means by which angular cutting adjustment of the blade may be obtained with minimum effort and is precluded from accidental displacement during the operation.

Other objects and many of the attendant advantages of this invention will be readily appreciated as the same becomes better understood by reference to the following detailed description when considered in connection with the accompanying drawings wherein:

Fig. 1 shows a perspective view of the apparatus of the invention with the cutter blade in the trimming position.

Fig. 2 is an enlarged side elevation view of the cutting blade assembly in the edging position connected to the driving means and to the means for varying the cutting height of the cutting blade.

Fig. 3 is a view similar to Fig. 2 showing the cutter blade in two positions: a low cutting height position (solid line) and an inoperative cutting position (dotted lines).

Fig. 4 shows a section of the apparatus taken on the line IV—IV of Fig. 2 with parts broken away.

Fig. 5 is a side elevation view similar to Fig. 4, but the cutter blade assembly is in the horizontal trimming position.

Fig. 6 shows a section of the apparatus taken on the line VI—VI of Fig. 4.

Fig. 7 is a front elevation view of the front wheels in the edging position.

Fig. 8 shows a front elevation view of the front wheels in position for an edging operation along a curb or the like.

Fig. 9 is a front elevation view of the front wheels in the trimming position.

Fig. 10 is a perspective view of the detachable keeper associated with the front wheels.

Fig. 11 shows a section of the apparatus taken on line XI—XI of Fig. 2.

Referring now to the drawings, wherein like reference characters designate like or corresponding parts throughout the several views, there is shown in Fig. 1 a lawn trimming and edging apparatus 20 having a horizontally disposed frame 21 supporting a driving means 22, a cutting blade assembly 23, and means 24 pivotally mounting the assembly 23 on the frame 21 for varying the cutting height and for adjusting the cutting angle of the cutting blade assembly 23.

The horizontally disposed frame 21 has forward and rearward ends 25 and 26, respectively. A rearwardly and upwardly extending handle 27 is connected to the rear end 26 of the frame 21, and the uppermost ends of the handle are turned outwardly in conventional manner in a relatively horizontal plane for convenient grasping by the operator. A curved rack 28 is fixed to the upper end of the handle 27 and includes a number of arcuately spaced slots 128, a selected one of which lockingly cooperates with a lever 29 which is pivotably mounted on a pin 31 secured to the handle 27. The function of rack 28 and lever 29 will be described hereinafter.

A pair of spaced rear wheels 32 are rotatably mounted on the rearward end 26 of the frame 21 by any suitable means, such as a pin 33 and locking nuts 34. A horizontal axle 35 (Figs. 7 to 9) is fixed to the forward end 25 (Fig. 1) of the frame 21 and two front wheels 36 and 37 are slidably and rotatably mounted therein. As best seen in Fig. 7, a substantially U-shaped detachable keeper 38 is adapted to removably engage the axle 35. The keeper 38 is approximately the same length as the distance between the wheels 36 and 37 when they are in the spaced edging position shown in Fig. 7. In Fig. 9, the wheels 36 and 37 are shown adjacent each other on the lefthand end of the axle 35 as viewed from the front; in this position the cutter blade assembly 23 is in the trimming position as shown in Figs. 1 and 5. In Fig. 8, the wheels 36 and 37 are adjacent each other on the righthand end of the axle 35 to permit both wheels to roll on a curb during edging, if desired. It is thus seen that means is provided for positioning one of the forward wheels in, selectively, a wheel trimming position wherein the thus positioned wheel is outside the arc swept by said cutter blade means in its trimming position and wheel edging position wherein said positioned wheel is within said swept arc.

Referring to Figs. 1 to 3, the pivotally mounting means 24 comprises a sleeve 39 having forward and rearward ends 41 and 42, respectively, and an apertured boss or ear 43 protruding downwardly from sleeve 39 intermediate its ends. A suitable pin or bolt 44 passes through the ear 43 and is fixed to the frame 21, and thus pivotally mounts the sleeve 39 to the frame 21. A vertically extending lever arm 45 is fixed at its lower end to the rear end 42 of the sleeve 39 by welding 145 or any other suitable means and thus also pivots about the bolt 44. An elongated rod 46 connects the upper end of the arm 45 to the lever 29 by having its ends bent to be received in openings 40 (Fig. 2), in the link 45 and lever 29 and secured therethrough by a cotter pin 48. With this arrangement, the lever 29 can be pivoted forwardly or rearwardly on the handle 27 and this motion will be transmitted through rod 46 and arm 45 to pivot the sleeve 39 about the bolt 44. The lever 29 can be placed in any desired one of the slots 128 in the rack 28 to lock the sleeve 39 in any desired position, the lever being slightly rockable transversely to permit selective engagement and disengagement with rack 28.

A curved rack 47 is fixed to move with the sleeve 39 by being welded to the arm 45 and to a supporting angle bracket 48' which is fixed to the sleeve 39. An elongated rod 49 is slidably received in the sleeve 39 and its rear end 51 projects rearwardly and outwardly beyond the rear end 42 of the sleeve 39. A detent pin 52 is pivotally mounted on the rear end 51 of the rod 49 for pivotal movement longitudinally of the rod 49 by a pin 53. A small spring 54 is mounted on the lower end of the detent pin 52 and engages the rear end 51 of the rod 49 to urge the pin 52 forwardly into locking engagement with a selected slot 147 in the rack 47. The pin 52 can be rotated in a transverse direction to the longitudinal axis of the rod 49 by pulling back against the pressure of the spring 54, thus unlocking it from one of the slots in the rack 47 and rotating it. As the pin 52 is thus rotated, the rod 49 is also rotated because of the pin connection 53.

The forward end 50 of the rod 49 has the cutting blade assembly 23 secured thereto. By preference, the forward end 50 of the rod 49 terminates slightly forward of the horizontal axle 35. The cutting blade assembly 23 comprises (Figs. 4 and 5) a housing 55 having a collar 56 fixed on one end thereof. The housing 55 is mounted transversely of the longitudinal axis of the rod 49. The forward end 50 of the rod 49 is fixed to the collar 56.

An elongated coiled spring 57 is mounted around the rod 49 between the collar 56 and the forward end 41 of the sleeve 39 and urges the cutting assembly 23 away from the sleeve 39.

A driven shaft 58 is rotatably mounted in the transverse housing 55 by bearings 59 and 61. A driven pulley 62 is fixed to the shaft 58 by any suitable means (not shown) and a cutter blade 63 is fixed to rotate with the other end of the shaft 58 by a nut 64 engaging threads 65 on the shaft 58. A suitably curved guard 66 partially surrounds the cutter blade 63 and is fixed to the housing 55 by being welded to a supporting V-shaped collar 67 which is secured on the housing by a bolt 68 and a nut 70. (Fig. 6). The driven pulley 62 is also provided with a curved guard 69 which is welded to the collar 56.

Referring to Figs. 1 to 3, the driving means 22 is shown as a gasoline driven engine of the type generally used on power lawn machines. However, it will be understood that the particular driving means forms no part of the present invention and any suitable type of driving means can be used. A driving shaft 71 extends outwardly from the driving means 22 on the same side of the apparatus 20 as the sleeve 39. A driving pulley 72 is secured on the end of the shaft 71 by a key 73. A belt 74 runs from the driving pulley 72 to the driven pulley 62 for rotating the driven shaft 58 and the cutter blade 63. Upper and lower keepers 75 and 76 respectively, are positioned around the pulley 72 to retain the belt 74 on the pulley 72. Keepers 75 and 76 are rigidly attached to frame 26 by a bolt 77 and nut 78. The tension of the belt 74 can be increased or decreased by movement of the driven pulley 62 downwardly or upwardly, respectively. When the cutting assembly 23 is in the edging position (Figs. 2 to 4) the axes of rotation of the pulleys 62 and 72 are parallel to each other; but when the cutting assembly 23 is in the trimming position (Figs. 1 and 5) the axes of rotation of the pulleys 62 and 72 are perpendicular to each other and the belt 74 is given a quarter twist.

Referring to Fig. 3, the solid line position of the belt 74 and the cutting assembly 23 indicates the operating edging position; whereas, the dotted line position indicates the inoperating edging position of the cutter assembly 23 and the belt 74. The belt 74 is in the slackened position shown by the dotted lines because the axis of rotation of the pulleys 62 and 72 are closer together than in the solid line position. Also due to the rigidity of the belt 74, the keepers 75 and 76 force the end of the belt 74 around the pulley 72 away from the pulley 72 in the inoperative dotted line position. It should be understood that the cutter blade assembly 23 can become inoperative in either the edging positions (Figs. 2 and 3) or the trimming position (Fig. 1).

The operation of the apparatus of the present invention is simple and as follows: When the operator of the apparatus 20 desires to trim the lawn, he slides the front wheels 36 and 37 to the adjacent position shown in Figs. 1 and 9 by positioning the keeper 38 on the righthand side of the axle 35 as seen from the front; he then rotates the detent pin 52 downwardly into the position shown in Fig. 1 and locks it in the proper slot 147 in the rack 47; and then rotates the lever 29 downwardly to adjust the proper cutting height for the cutter blade 63.

When the operator desires to use the apparatus 20 to edge the borders of the lawn, he rotates the detent pin 52 upwardly to the proper slot 147 in the rack 47; detaches the keeper 38 from the axle 35, slides the wheel 37 away from the wheel 36, and places the keeper 38 on the axle 35 between the spaced wheels 36 and 37 as shown in Fig. 7; and rotates the lever 29 downwardly or upwardly to adjust the depth of the cut to be made by the cutting blade 63. The driving means can be running or stopped when the proper adjustments are being made to either trim or edge the lawn.

The detent pin 52 acts as a cutting angle adjusting means because it can be adjusted to rotate the cutting blade assembly between a horizontal position and a vertical position, and thus vary the angle at which the cutter blade 63 will cut the grass of the lawn.

It should be noted that the cutter blade 63 always has adequate support from the front wheels 36 and 37, regardless of whether it is in the trimming or edging position due to the sliding arrangement of the wheels 36 and 37. In addition, there is less chance of the belt 74 slipping when the cutter blade is lowered because the tension in the belt is increased when the cutter blade assembly 23 is lowered. This becomes important especially when the cutter blade 63 is in the edging position and a relatively deep cut is desired.

Obviously many modifications and variations of the present invention are posisble in the light of the above teachings. It is therefore to be understood that within the scope of the appended claims the invention may be practiced otherwise than as specifically described.

I claim:

1. A lawn trimming and edging apparatus having a continuous two-point support adjacent the means for trimming and edging, comprising: a horizontally disposed frame having forward and rearward ends; a pair of spaced rear wheels rotatably carried on the rearward end of said frame; a horizontal axle mounted on said forward end of said frame transversely to the normal travel of the apparatus; forward wheels rotatably and slidably carried on said axle and adapted to be positioned adjacent each other or laterally spaced from each other; cutter blade means for cutting the lawn; means rotatably mounting said cutter blade means on the forward end of said frame adjacent said axle; means adjusting the cutting angle of said cutter blade means between a substantially vertical edging position and a substantially horizontal trimming position; means positioning one of said forward wheels in, selectively, a wheel trimming position wherein the thus positioned wheel is outside the arc swept by said cutter blade means in its trimming position and wheel edging position wherein said positioned wheel is within said swept arc; and driving means mounted on said frame for driving said cuter blade means in either the trimming or edging position, whereby the front wheels are positioned adjacent each other when the cuter blade means is in the trimming position and the front wheels are laterally spaced from each other when the cutter blade means is in the edging position.

2. The combination set forth in claim 1 including means connected to said cutter blade means for varying the cutting distance between said cutter blade means and the lawn.

3. The combination set forth in claim 2 wherein said latter means comprises a sleeve having forward and rearward ends; means pivotally mounting said sleeve on one side of said frame in a substantially horizontal forward position, an elongated rod slidably and rotatably mounted in said sleeve and extending beyond both ends of said sleeve; the forward end of said rod terminating slightly forward of said axle and having said cutter blade means secured thereto, and a spring mounted around said rod between said forward end of said sleeve and said cutter blade means urging said latter means away from said sleeve.

References Cited in the file of this patent

UNITED STATES PATENTS

| | | |
|---|---|---|
| 2,724,229 | Graham | Nov. 22, 1955 |
| 2,787,107 | Strasel | Apr. 2, 1957 |
| 2,791,875 | Faas | May 14, 1957 |